E. M. SCHANTZ.
INDICATING MEANS FOR TEACHING MUSIC.
APPLICATION FILED APR. 28, 1913.
1,324,274.
Patented Dec. 9, 1919.
5 SHEETS—SHEET 1.
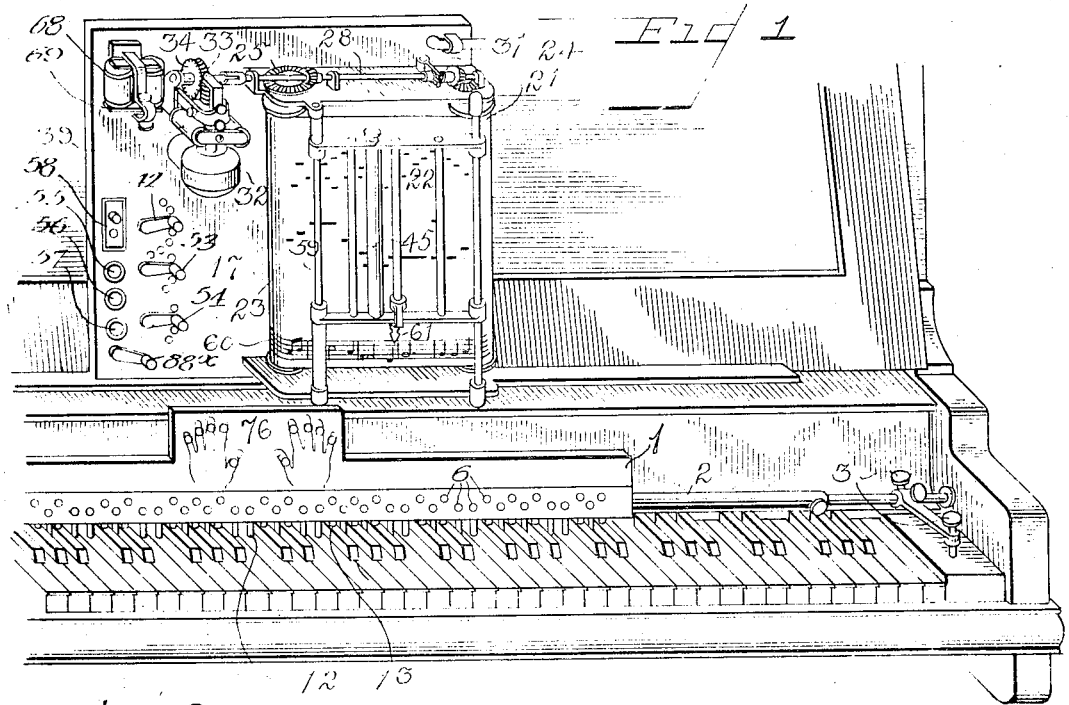
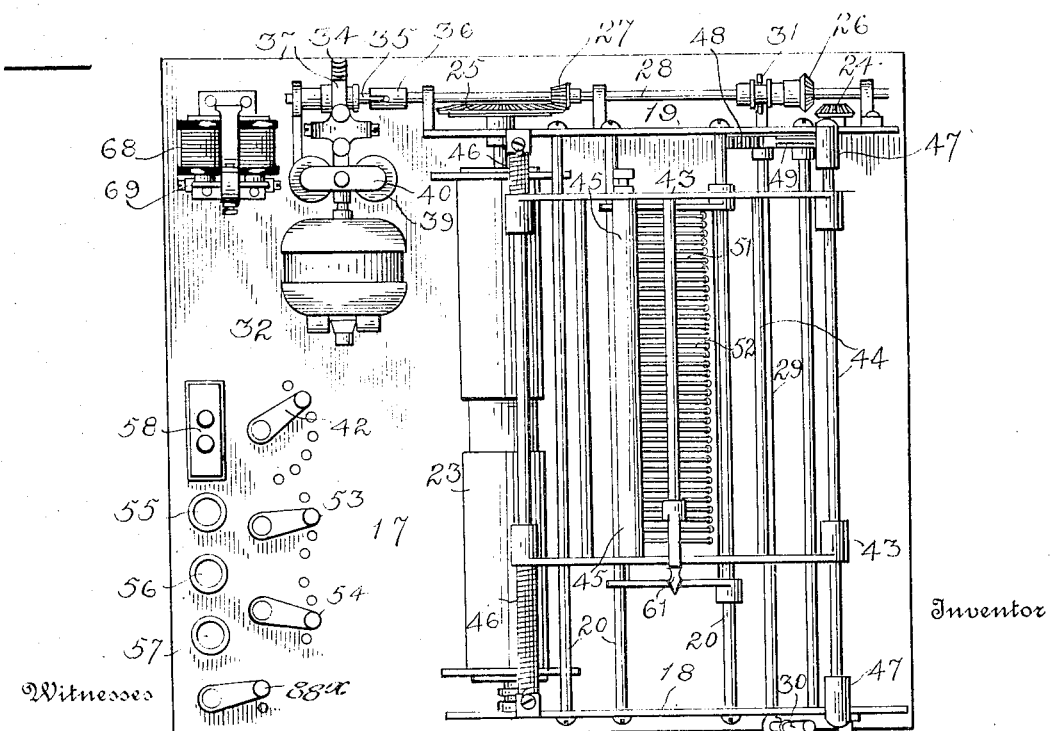

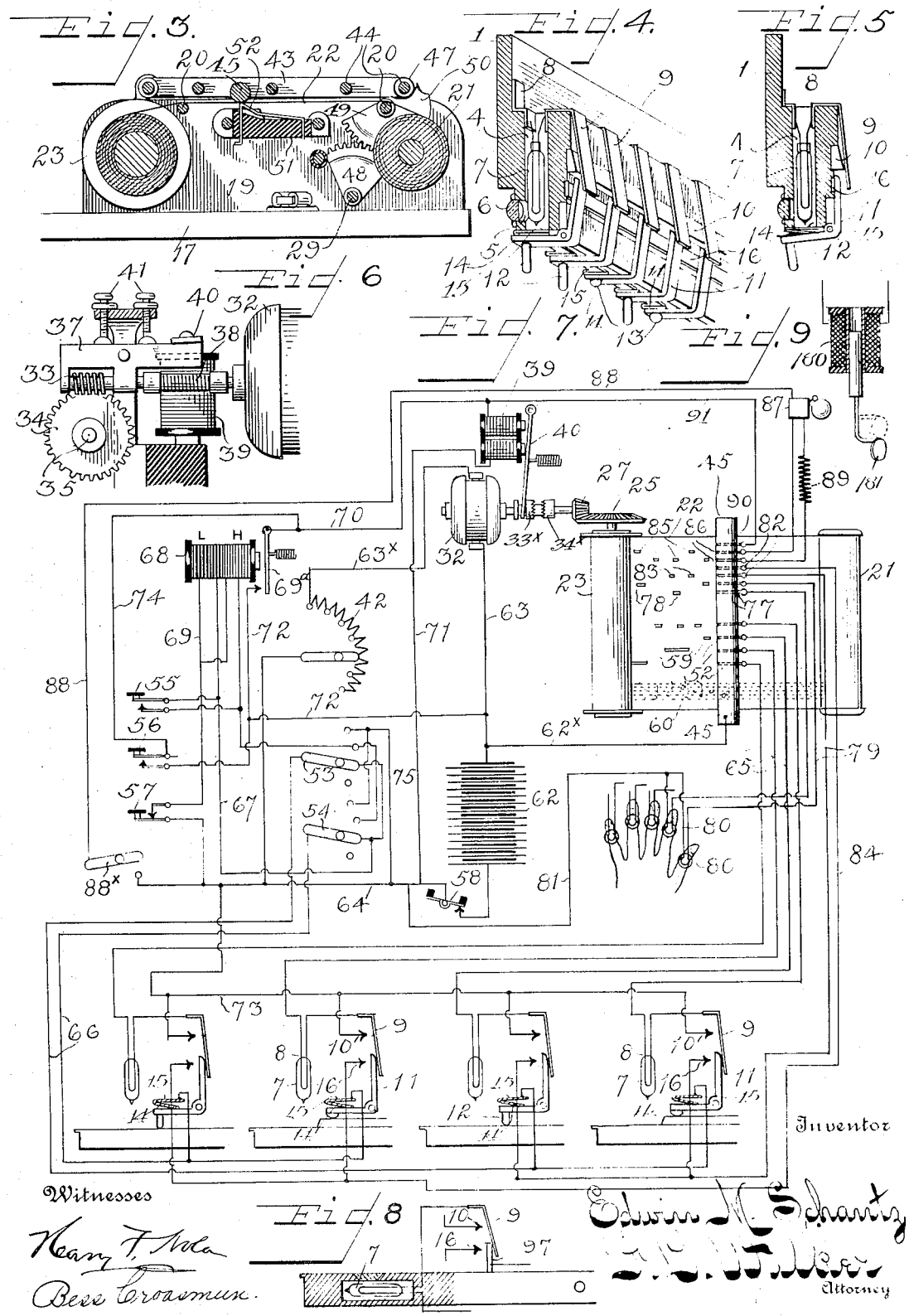

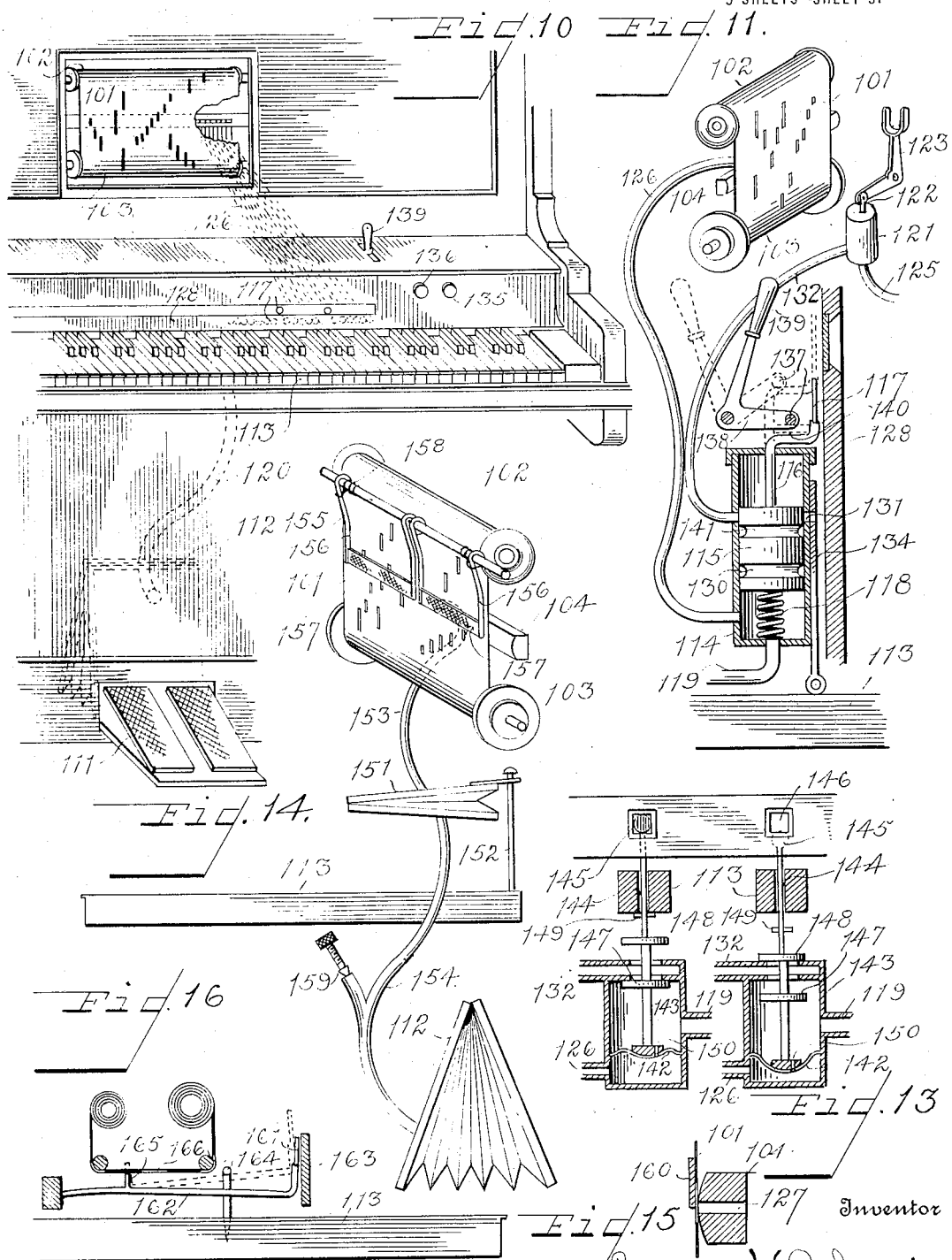

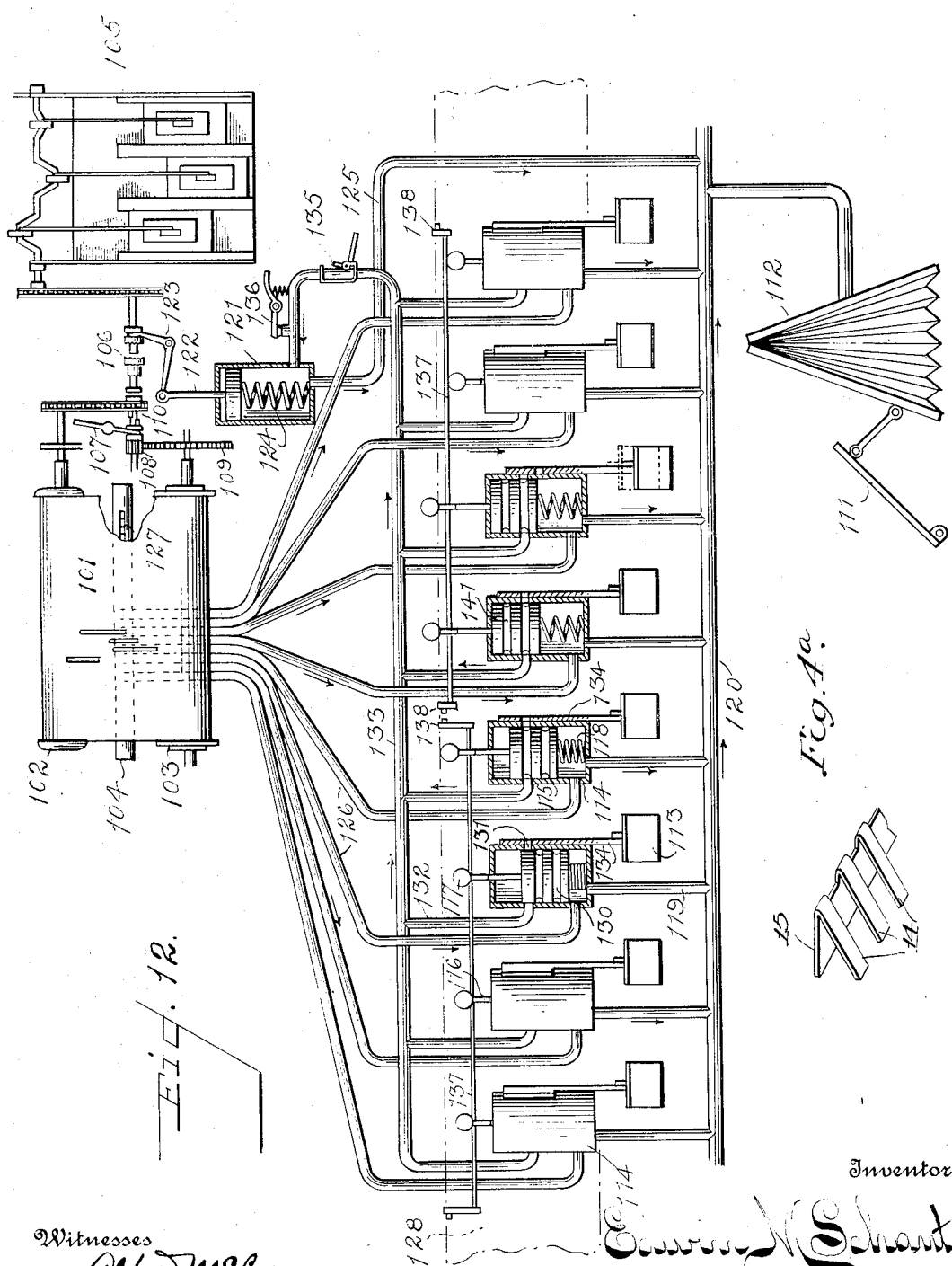

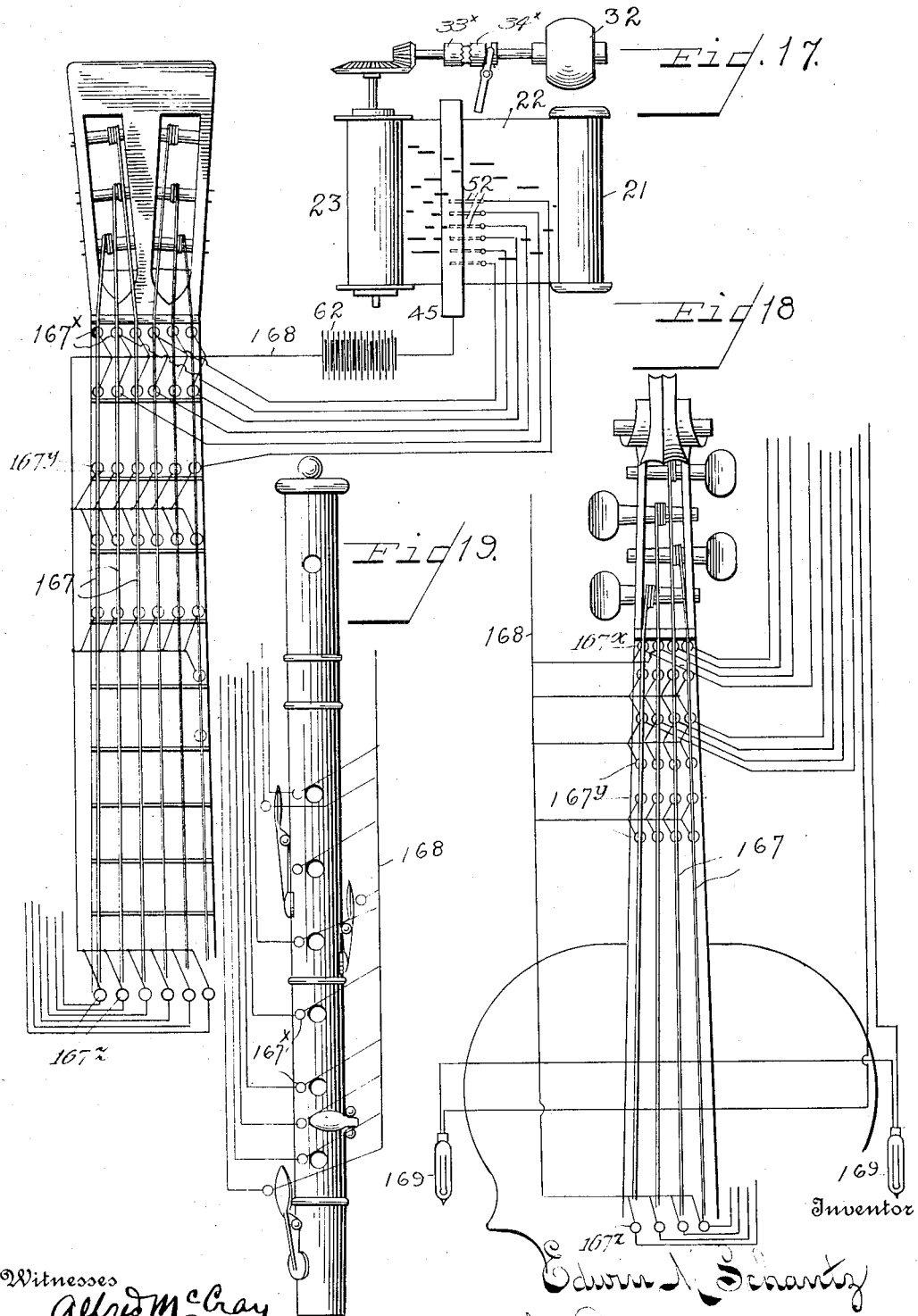

UNITED STATES PATENT OFFICE.

EDWIN M. SCHANTZ, OF DAYTON, OHIO.

INDICATING MEANS FOR TEACHING MUSIC.

1,324,274. Specification of Letters Patent. Patented Dec. 9, 1919.

Application filed April 28, 1913. Serial No. 764,060.

*To all whom it may concern:*

Be it known that I, EDWIN M. SCHANTZ, citizen of the United States, residing at Dayton, in the county of Montgomery and State of Ohio, have invented certain new and useful Improvements in Indicating Means for Teaching Music, of which the following is a specification.

My invention relates to the musical arts and comprises an automatically-operated apparatus for instructing the novice to perform upon a musical instrument. This is accomplished by means of signals visible to the eye for preindicating the particular elements to be manipulated in playing a musical instrument. Such signals are energized in predetermined sequence for different intervals of time in accordance with the composition to be played. In addition to preindicating the particular element to be operated, other signals are employed to preindicate the particular digit to be employed. The sequence of the signals is controlled by a note sheet or similar device and ordinarily the succession of signals is arrested until the indicated key or element is operated. Thus the operation of the next succeeding signal of the sequence is controlled by the operation of the indicated key or element regardless of the location of the key or element to which the next succeeding signal pertains in relation to the one operated. In addition to said signal mechanism means is provided for audibly marking the time beats of each measure in unison with the rendering of the composition.

The apparatus is designed to eliminate the tedium from the initial instruction by enabling the beginner to immediately play simple compositions, thereby arousing and holding his interest.

Under the usual methods of musical instruction the beginner is burdened with learning the different clefs, the positions of the notes upon the staff, the names or letters of the notes, their time values, the associated operative elements, sundry signs and definitions, all of which are uninteresting, and to the novice of a few years of age, practically unintelligible. These difficulties frequently cause the beginner to abandon his studies.

By the use of the apparatus as herein described, the novice acquires a knowledge of musical matters and learns to perform upon the instrument by a natural method, somewhat similar to the method by which a child learns to talk. A child learns to speak and to assemble his words into sentences before he learns the alphabet or acquires a knowledge of spelling and before he is familiar with the rules of grammar. At the time he learns to speak he is unable to recognize the written or printed words. He is instructed in spelling, reading, grammar and rhetoric long after he has acquired the power of speech. In a somewhat similar way, by the use of the apparatus, forming the subject matter hereof, the novice is taught by rote to play simple compositions before he is able to read the music. Later when he has familiarized himself with the mechanical operations of the instrument, and has acquired a musical sense and after his enthusiasm is thoroughly aroused, he is gradually instructed in the rules, signs, theory and formal matters pertaining to music.

The invention herein set forth is an amplification of the apparatus described and claimed in my co-pending application, Serial No. 619290, April 6, 1911.

The object of the invention is to simplify the structure as well as the means and mode of operation of such devices, whereby they will not only be cheapened in construction, but will be more efficient in use, accurate in operation, automatic in action, under absolute control of the player or instructor and unlikely to get out of repair.

Further objects of the invention are to provide improved controlling means, whereby the instructor may at will disconnect the visual signals in order to test the ability of the student to play the composition from memory and to provide means whereby the instructor may temporarily reconnect the visual signals to prompt the student when playing from memory; to provide means whereby the instructor may momentarily arrest the operation of the apparatus and to provide controlling means whereby the apparatus may be operated either through a step-by-step-movement or continuously.

A further object of the invention is to provide means for indicating to the student the proper finger with which the particular note is to be played and to provide means for simultaneously indicating upon the staff the written musical notation corresponding to the key or other operative element indicated by the visual signal, Further objects of the invention are to provide means for automatically controlling the signals by either electrical, pneumatic or mechanical means.

With the above primary and other incidental objects in view, as will more fully appear in the specification, the invention consists of features of construction, the parts and combinations thereof, and the mode of operation, or their equivalent, as hereinafter described and set forth in the claims.

Referring to the drawings, Figure 1 is a perspective view of a portion of a piano to which the electrically operated apparatus, forming the subject matter hereof, has been applied. Fig. 2 is a plan view of the note sheet control mechanism. Fig. 3 is a sectional view. Fig. 4 is a sectional view of a portion of the electrical signal bar, showing the connections of the electrical signals in their operative or normal position. Fig. 4$^a$ is a detail perspective view of the common conductor and spring contacts for the signals. Fig. 5 is a transverse sectional view of the bar showing the several parts in operated positions. Fig. 6 is a detail view of the motor driving connection and the electrical means for intermittently connecting and disconnecting the motor and the driving mechanism. Fig. 7 is a diagrammatic view of the electrical connections. Fig. 8 is a detail view of a modification showing the visual signal located in the key of the instrument. Fig. 9 is a detail view of a solenoid to be employed as a signal device in lieu of the lamp shown in previous figures. Fig. 10 is a perspective view of a portion of a piano, showing a pneumatically controlled signal apparatus applied thereto. Fig. 11 is a detail, sectional view of the pneumatic signal apparatus. Fig. 12 is a view somewhat diagrammatic of the several parts of the pneumatic signal apparatus. Fig. 13 is a detail sectional view of a modification of the pneumatic signal operating mechanism. Fig. 14 is a detail perspective view of means whereby a mechanical player-piano may be adapted to indicate the proper keys to be operated by producing a limited movement of the key, sufficient to distinguish that particular key from the adjacent keys, but insufficient to produce a playing of the note. Fig. 15 is a modification thereof. Fig. 16 is a detail view of the mechanical means for signaling the particular key to be operated and for arresting the note sheet until the signaled key is operated. Figs. 17, 18, 19 show the application to various instruments.

Like parts are indicated by similar characters of reference throughout the several views.

While the apparatus forming the subject matter hereof is particularly adapted for use with a piano and is so illustrated and described, it is to be understood that it is not limited to such use, but may be adapted to other musical instruments to indicate the proper sequence of manipulation of the operative elements or keys thereof.

In a general way the apparatus comprises a series of visual signals, which may be either electric lamps or targets, associated with each key or operative element of the instrument to indicate when that particular key is to be operated. In lieu of the signal lamps or targets the key itself may be employed as a signal by causing a slight movement thereof, sufficient to distinguish the particular key to be played from the adjacent keys, but insufficient to accomplish the playing of the note. These visual signals are energized in predetermined sequence at proper intervals of time, in accordance with the musical composition to be played by a traveling perforated note sheet, such as is commonly used for operating mechanically played pianos. The controlling element, as shown in the drawing is similar in form to the usual perforated note or music sheet commonly employed in mechanical players, and will be hereafter referred to as the "note sheet." It will be understood, however, that it differs from the note sheet common in the art, in that it does not at any time operate the musical instrument nor sound a note thereon. This so-called note sheet merely controls the sequence of operations of the signals which pre-indicate the particular keys or other elements of the musical instrument to be manipulated by the player. The several series of signals are employed to indicate first—the particular element or part of the musical instrument such as the key, the string, the plunger, or valve upon which the pupil is to place his finger; second—the particular digit to be employed; and third—in the case of a stringed instrument such as a guitar or violin, the particular spot or position in which the finger is to be placed. Inasmuch as the invention is not limited to any particular instrument but is applicable to instruments of different types, the term "playing element" is employed herein and throughout the claims to indicate that part of the instrument to be manipulated by the fingers of the pupil in playing such instrument whether such element or part is specifically known as a key, as in the case of a piano or organ, or a string, as in the case of a violin, guitar, harp or similar instrument, or as a plunger, as in a cornet, or a valve as in a flute. The term "playing element" will be understood as a generic term applicable to the manipulated parts of a musical instrument of whatever type. The operation of the signals may be by electrical, pneumatic or mechanical means controlled by said perforated note sheet. The note sheet is moved through a step by step movement and is arrested as each signal is energized until the corresponding key is operated, or it may be operated through a continuous movement. If the note sheet is operated by a step by step movement it is released for each succeeding movement by operation of the particular key, indicated by the energized signal. It is obvious that the apparatus may be made a component part of a musical instrument as shown in Fig. 10, or it may be a separate appliance to be employed in conjunction with an instrument of ordinary construction as shown in Fig. 1.

Referring to the drawings, 1 is a bar transversely disposed above the keys of the instrument and supported at its opposite ends by extendible arms 2, which engage the cheek blocks at the opposite ends of the key board. To enable the bar 1 to be placed in proper vertical adjustment in relation with the keys, adjustment screws 3 are provided in lateral extensions of the arms 2.

The bar 1 is provided with a series of vertical holes 4, each intersected by a horizontal hole 5. Located in the horizontal holes 5 are translucent bodies 6, which may be of any desired color. Located within the vertical holes 4 are electric lamps 7, which illuminate the translucent bodies 6. Each of the lamps 7 and its corresponding translucent body 6 are located in the bar 1, immediately above the corresponding key.

In order to distinguish the signals relating to the black keys from those relating to the white keys, the signals are arranged in two tiers; the black key signals being located in the upper tier and the white key signals in the lower tier, as shown in Fig. 1. It is obvious, however, that instead of arranging the signals in two tiers, translucent bodies of different colors may be employed to distinguish the signals corresponding to the white and black keys.

The opposite sides of the lamps 7 are electrically connected with the terminals 8 and 9 upon the bar 1. The terminal 9 comprises a flexible, flat spring normally tending to approach the bar 1 to make contact with the longitudinal contact bar 10, common to the series of signals. The signals are divided into two series, one for the treble and one for the bass, as hereafter mentioned, but the contact bar 10 is common to both of said series.

Pivotally supported upon the lower, rear edge of the bar 1 is a series of metallic levers 11 spaced to engage the keys of a piano key board, there being one of such levers and corresponding lamp and terminal 9, provided for each key of the instrument. The forward end of the levers 11 rests upon the keys, by which they are supported in their normal position.

To compensate for the difference in height of the white and black keys, those levers corresponding to the white keys are provided with extended studs 12, which engage the white keys, while levers corresponding to the black keys have only small knobs or buttons 13, which engage the tops of the black keys. Upon the depression of a key, the corresponding lever will be permitted to oscillate about its pivotal connection with the bar 1.

The levers 11 are electrically connected one with the other throughout the series by means of spring fingers 14, engaging the levers 11 throughout all positions of their oscillatory adjustment. The spring fingers 14 are electrically connected one with another throughout the series by a common conductor 15 extending along the lower edge of the bar 1, as indicated in Fig. 4. In their normal or elevated positions as shown in Fig. 4, the levers make electrical contact with the spring terminals 9, holding said terminals 9 out of engagement with the contact bar 10. The circuit at such time passes, as hereafter described, to the terminal 8, thence through the lamp or signal means 7 to the spring terminal 9, thence to the lever 11 in contact therewith, thence through the spring finger 14 to the common bar 15. The spring fingers 14 are connected to the bar 15 and at all times engage the levers 11 in all positions.

When a key of the instrument is depressed the lever 11, corresponding to such key, will be permitted to oscillate downward as shown in Fig. 5. Such movement of the lever breaks the contact between said lever and its corresponding spring terminal 9, allowing the terminal 9 to engage and close an electrical contact with the bar 10. At the same time the lever 11 will make an electrical contact with a second longitudinally disposed contact bar 16, similar to the contact bar 10; separate bars 16 are provided for the treble and bass.

The control mechanism, by which the sequence of operation of the signals is regulated, is best shown in Figs. 2 and 3. This control mechanism may be located in any part of the room or even at a more distant point if so desired, but is preferably placed before the player in the position usually occupied by the music score. This control mechanism comprises a base 17 on which is mounted a suitable frame, comprising end plates 18 and 19, connected by transverse rods 20. Journaled in the end plates 18 and 19 is a roll 21 upon which is carried the perforated note sheet, the perforations of which correspond to the notes of the musical composition to be played. The note sheet 22 passes from the roll 21 over the guide rods 20 to a receiving roll 23, also journaled in the end plates 18 and 19. During its operative movement, the note sheet passes from the roll 21 to the roll 23 and is then rewound upon the roll 21, by reversing the driving mechanism, similar to the method now employed in the mechanical players. To wind and rewind the note sheet, there are provided upon the trunnions of the rolls 21 and 23, bevel gear pinions 24 and 25 respectively. These gear pinions 24 and 25 are adapted to mesh with corresponding gear pinions 26 and 27, carried upon a longitudinally movable, revoluble shaft 28. The pinions 26 and 27 are so mounted upon the shaft 28, that only one of said pinions may be in mesh with its corresponding gear at a time, that is when the pinion 27 is in mesh with the pinion 25, as is shown in Fig. 2 the pinion 26 will be out of mesh with its corresponding pinion 24. Upon the longitudinal movement of the shaft 28, the gear pinion 27 will be disengaged from the pinion 25 and the pinion 26 engaged with the pinion 24, or vice versa. To effect this reciprocatory movement of the shaft 28, there is provided a rock shaft 29 journaled in the plates, having at one end an operating lever 30, at its opposite end a bifurcated arm 31, engaging a grooved collar upon the shaft 28.

The shaft 28 is rotated to wind or rewind the note sheet by means of an electrical motor 32; this motor rotates a worm 33, which meshes with a worm wheel 34, carried upon an extension 35 of the shaft 28. To compensate for the reciprocatory movement of the shaft 28, a sliding coupling 36 is provided between the shaft 28 and its extension 35.

In order that the driving mechanism of the note sheet may be instantly connected and disconnected, the drive worm 33 is mounted on an oscillatory frame 37 and is connected with the drive motor 32 by a flexible shaft 38. This flexible shaft may be of any desired construction, but in the drawing has been shown as a helical spring which will permit the frame 37 to be oscillated in its relation with the motor, without interfering with the rotation of the worm 33. Located adjacent to the worm 33 is an electromagnet 39, the armature 40 of which, is carried upon the oscillatory frame 37. The construction is such that upon the energizing of the electromagnet 39, the armature 40 is attracted thereby, oscillating the frame 37 to lift the drive worm 33 out of engagement with the worm wheel 34, thereby permitting the worm 33 and motor to run free. Adjustment screws 41 are provided to limit the oscillation of the frame 37. Upon such disengagement of the worm 33 from the worm wheel 34, the advance of the note sheet 22 will be instantly arrested. Located at 42, upon the base 17, is a rheostat by which the speed of the motor 32 may be regulated to advance the note sheet 22, at greater or less speed corresponding to the variations of tempo, as presto, allegro, moderato and adagio, the corresponding points of the rheostat being designated by such appropriate terms. Pivotally supported upon the main frame is a swinging frame, comprising arms 43, connected by the tie rods 44, in which is carried a rod or bar 45, forming an electrical terminal common to a number of circuits hereinafter mentioned. This swinging frame is pressed downward to bring the common terminal 45 into position to be engaged by the several circuit terminals hereinafter mentioned, by springs 46. The free side of the swinging frame is supported upon the end plates 18 and 19 by extensions of one of the rods 44, as shown at 47.

In order that the swinging frame may be elevated to break the circuits, prior to the rewinding of the note sheet, there is mounted upon the rock shaft 29 a gear sector 48, meshing with a gear sector 49, journaled upon one of the tie rods 20 of the main frame. The gear sector 49 is provided with a cam extension 50, engaging the extension 47 of the frame. Upon each operation of the handle 30 to reverse the driving gears 24, 25, 26 and 27, to rewinding position, the cam 50 will serve to elevate the swinging frame to lift the common terminal bar 45 out of contact with the fingers 52.

Supported upon two of the main frame tie rods 20 is a body 51 of non-conductive material, upon which are arranged in spaced relation a series of spring contact fingers 52, normally tending to elevate themselves into contact with the common terminal bar 45 of the swinging frame. These spring-contact fingers 52 are spaced to agree with the spacing of the corresponding perforations in the note sheet.

The several spring contact fingers 52 are normally insulated from the common terminal bar 45, by the imperforate portions of the interposed note sheet 22. However as the note sheet 22 travels from the roll 21 to the roll 23, the perforations thereof, which are alined with the corresponding spring contact fingers, will permit the fingers to protrude through the perforations into engagement with the bar, to complete the circuits. Thus the circuits will be completed only through those contact fingers corresponding to the perforations passing under the terminal contact bar 45, while all other circuits will be broken by the interposed imperforate portion of the note sheet.

It is to be understood that the electrical circuits, controlling the apparatus are divided into two series, the first series of circuits relating to the treble keys and the second series of circuits relating to the bass keys. These series of circuits are separately controlled by two switches 53 and 54 relating to the treble and bass series respectively. Each of these switches has been shown in the drawing as adjustable to any one of four positions. By the adjustment of the switches 53 and 54 to the different positions, different results are accomplished. The lowermost position is an open one in which the series of circuits are rendered inoperative, while the other series may be employed. When the switches are adjusted to the second positions from the bottom, the circuits are connected to advance the note sheet by step-by-step movement, energizing the corresponding signal and arresting the movement of the note sheet until the proper key has been played. The switches are adjusted to this position during the preliminary instruction, until by repeated playing the student is enabled to play the composition from memory. The student's ability to play from memory is then tested by adjusting the switches to the third positions from the bottom, which will cause the note sheet to be advanced through a step-by-step movement without energizing the signals, the note sheet being arrested in each succeeding position until the proper key is operated. The advance of the note sheet will thus indicate that the proper key has been operated. However, under the conditions described, no preindication of the key to be played will be made as was previously described. The pupil is thus left to his own resources in selecting the proper key. In the fourth or uppermost position the note sheet will be caused to advance continuously, the signals being energized in proper sequence and at proper intervals of time to illustrate to the pupil the proper tempo in which the composition should be played, and the time value of each note.

In addition to the switches 53 and 54 there are provided temporary control switches 55, 56, and 57. The prompter switch 55 may be employed to temporarily energize the signals to refresh the memory of the student, during the time that the note sheet is being advanced without energizing the signals. The arrest switch 56 serves to disconnect the motor and note sheet winding mechanism and thereby arrest the movement of the note sheet at any time. The third temporary switch 57 serves to release the note sheet, whereby it will be operated through a continuous movement so long as the switch is closed. There is further provided a main switch 58, which directly controls the entire apparatus.

In addition to the perforations 59, corresponding to the notes of the musical composition, the note sheet carries adjacent to one edge thereof, a staff 60, upon which are indicated the usual musical notations. These musical notations are arranged in definite relation with the corresponding perforations of the sheet, whereby a pointer 61 will indicate the note upon the staff corresponding to the energized signal, which indicates the corresponding key. Thus at each forward movement of the note sheet the pupil has presented before him the written note and the associated key indicated by the visual signal.

Referring now to the circuits shown in Fig. 7, 62 is the battery from which extends a line 63 to the motor 32, the current passing thence through the line $63^x$ and the rheostat, thence to the line 64 and through the main switch 58 to the battery. This circuit serves to operate the motor 32 to drive the note-sheet winding mechanism. The common terminal bar 45 is connected with the battery 62 through the line $62^x$. As before stated, the contact fingers 52 are so located in relation with the perforations 59, that as the corresponding perforations are brought to operative position the contact 52 will protrude therethrough and make electrical connection with the common terminal bar 45. The several signal circuits will be closed in predetermined sequence, according to the location of the perforations in the note sheet and for different intervals of time, according to the extent of such perforations.

The contact having been made through one of the perforations between the contact finger 52 and the common terminal bar 45, the current passes from the finger 52, through the line 65 to the terminal 8 of the lamp 7, thence through the lamp to the spring terminal 9. This spring terminal being normally held out of contact with the contact bar 10 by the lever 11, the current will pass from the terminal 9 to the lever 11, thence through the line 66 to the control switch 53 or 54, according to whether the circuit is one of the treble series or the bass series.

If the switch 53 or 54 is in its second position, as shown in Fig. 7, the current will pass from the switch through the line 67, thence through the low resistance winding of the electro-magnetic switch or circuit closer 68, through the line 69, thence to the line 64, returning to the battery through the main switch 58. This completes the circuit and causes the signal light 7 to be energized. The passage of the current through the circuit closer 68 energizes the said circuit-closer to attract its armature $69^a$, which armature is electrically connected through the line 70 with the electromagnet 39, the opposite side of which is connected through the line 71 and the main switch 58 with the battery. The attraction of the armature 69 closes this circuit through the line 72 to the opposite side of the battery, thereby energizing the electromagnet 39 to attract its armature 40 and thereby disconnect the drive motor 32 from the note sheet winding mechanism. This arrests the advance of the note sheet until the proper key has been played. Fig. 7 being a diagrammatic view, the specific mechanism illustrated in Fig. 6 for connecting and disconnecting the motor with the note sheet actuating mechanism has not been shown in detail but a simple and commonly known form of clutch has been illustrated in lieu thereof. In this construction the clutch member 33$^x$ is slidingly mounted upon the shaft of the motor 32 and is shifted under the influence of the armature 40 into and out of engagement with the driven clutch member 34$^x$ under conditions similar to the engagement and disengagement of the driving worm 33 and gear member 34 of the specific construction shown in Fig. 6.

Upon the depression of the signaled key the lever is oscillated out of contact with the spring contact 9, permitting the latter to close the circuit with the contact bar 10. The current then after having passed through the lamp or other signal device, passes from the spring contact member 9 to the contact bar 10, thence to the line 73 and the line 64 through the main switch 58 to the battery. This maintains the signal lamp or other device in operated condition after the proper key has been depressed for as long an interval as the spring contact finger 52 remains in electrical engagement with the common terminal bar 45. Thus the signal will be maintained throughout an interval of time corresponding to the time value of the note.

When the switch 53 or 54 has been adjusted to the third position the circuit will be the same as aforedescribed except that the current will be passed through the high resistance winding of the circuit closer 68, instead of the low resistance as before mentioned. The inclusion of the high resistance winding of the circuit closer 68, prevents the operation of the signal light 7. Therefore with the switch in this position the note sheet will advance by a step-by-step movement but the visual signal will not be operated.

If during the time that the switch 53 or 54 is in its third position it should be desired to operate the visual signals temporarily for the purpose of prompting the student, the switch 55 is closed thereby bridging a line across the high resistance winding, allowing the visual signals to be operated during the time that the switch 55 is closed.

If it is desired at any time to temporarily arrest the progress of the note sheet, the arrester switch 56 is closed thereby closing a circuit from the battery through the line 72 and said switch 56, thence through the line 74 to the line 70, which carries the current around the armature contact of the circuit closer 68, the circuit continuing through the line 70 to the electromagnet 39, which as before stated is connected with the battery. The electromagnet 39 being thus energized, attracts the armature 40, thereby disconnecting the drive motor 32 from the note sheet winding mechanism.

If on the other hand at any time during the step by step movement of the note sheet it is desired to temporarily advance the note sheet through a continuous movement, the release switch 57 is opened, thereby demagnetizing the circuit closer 68. The circuit closer 68 being demagnetized the armature contact 69 remains open, thereby opening the circuit through the electromagnet 39, rendering the latter inoperative and the motor 32 remains in driving connection with the note sheet winding mechanism. It is to be understood that the motor 32 is in constant circuit with the battery, whenever the main switch 58 is closed.

Whenever the switch 53 or 54 is in its uppermost or fourth position, the circuit passes from the spring finger 52 through the lamp 7 and the connections before described to said switch, thence from the fourth position of the switch through the line 75 directly to the battery, through the main switch 58, without passing through the circuit closer 68 as before described. The elimination of the circuit closer 68 permits the electromagnet circuit to remain open by the non-operation of the armature 69, whereby the electromagnet 39 will not operate to disconnect the motor and the driving mechanism, therefore the note sheet will continue to advance in a continuous movement with the signal lights or other devices operated in predetermined sequence and proper tempo in accordance with the perforations of the note sheet.

In addition to the electric circuit thus far described relating to the signaling of the keys and corresponding with the musical notations upon the staff and represented by the perforations of the note sheet, there are other electrical circuits controlled by other spring fingers coöperating with different sets of perforations in the note sheet, for accomplishing other results.

In order to indicate to the student the proper finger with which succeeding notes are to be played, there is provided upon the upper portion of the bar 1 a panel 76, having thereon the representation of two hands, with each digit of which there is associated a signal lamp or other signal device. There are also provided a series of spring contact fingers 77, similar to the contact fingers 52, which are adapted to make electrical contact with the common terminal bar 45, through corresponding perforations 78 in the note sheet 22.

In Fig. 7 of the drawings but two of these spring contact fingers 77 have been shown.

A perforation 78 corresponds with each note represented by the perforations 59, and registers with a spring contact finger 77 corresponding to the digit, with which the key is to be operated. As the note sheet advances, for each contact made by a spring finger 52 to energize one of the key signal devices, a simultaneous contact is made by one of the spring contact fingers 77 through one of the perforations 78 to simultaneously energize one of the digit-signal devices to indicate the finger with which the signaled key is to be operated. The closing of the contact between the spring finger 77 and the terminal bar 45 completes a circuit through the line 79 to the digit signal 80, thence through the line 81 to the battery.

When a note is to be successively repeated, to prevent the student from holding the key down throughout the interval of such repeated notes, and to insure the separate manipulation of the key for such repeated note, there are provided two contact fingers 82, one for the treble and one for the bass, which fingers are similar in form and operation to the fingers 52. There is provided in the note sheet 22 in a position in transverse alinement with the imperforate space between the successive repeated perforations, a perforation 83, through which the corresponding contact finger 82 makes contact with the common terminal bar 45. This closes a circuit through the line 84 to the common bar 16 with which the pivoted lever 11 makes contact when the key is depressed, from which it passes through the line 66 to the switch 53 or 54, thence through the circuit closer 68 to the battery, thereby energizing the circuit closer 68 to close the circuit through the electro-magnet 39 and thereby disconnect the motor 32 during the interval between each pair of successive repeated notes.

To mark the time in which the composition should be played, there are provided in the note sheet 42, in transverse alinement with the perforations of the several notes, two series of perforations 85, one series of which marks the accented beats, while the other series marks the unaccented beats. Two spring fingers 86, likewise corresponding in form and operation with the spring fingers 52 are provided.

One of the spring fingers 86 is adapted to make contact with the common terminal bar 45 through those perforations representing the accented beats, while the other spring finger 86 makes contact through those perforations representing unaccented beats. By their contact with the common terminal bar 45, these spring fingers close the circuit through a timing device 87, thence through the line 88, in which is included a switch $88^x$, thence through the line 64 and main switch 58 to the battery. Located in the circuit, intermediate the timing device and the contact finger 86, corresponding to the unaccented beat, is resistance 89, whereby the operation of the timing device due to the closing of the circuit through the perforations corresponding to the accented beat is distinguished from the operation of the timing device due to the closing of the circuit through the perforations representing the unaccented beat. By opening the switch $88^x$, the timing device may be rendered inoperative.

To arrest the operation of the mechanism when the end of the composition is reached, there is provided an additional spring finger 90 adapted to make contact with the common terminal bar 45 through a single perforation in the note sheet at the end of the composition, thereby closing the circuit through the line 91 and the electromagnet 39 to disconnect the drive motor 32. It is to be understood that in lieu of the signal lamp shown in the drawings an electrical solenoid 180 may be employed, to the movable core of which a dart or target 181 may be attached and brought into view by the movement of the core upon the energizing of the solenoid. Such signal solenoid is shown in Fig. 9. In Fig. 8 is shown a modification, in which the lamp 7 is located in the key. In this instance a stud 97 carried by the key, performs the functions of the lever 11.

While the signal devices may be electrically controlled as hereinbefore described, it is equally obvious that they may be controlled by pneumatic means. Referring to sheets 3 and 4 and particularly to Figs. 10, 11 and 12, there is shown pneumatic operating means of the mechanical piano player type. It is obvious that such apparatus might be constructed separately and applied to any instrument, similar to the method disclosed in the preceding figures.

Referring to said figures, 101 is the perforated note sheet, wound from the roll 102 to the receiving roll 103 and passing intermediate said rolls over the tracker bar 104. The rolls 102 and 103 are rotated to wind and rewind the perforated note sheet by means of an air driven motor 105, adapted to be connected and disconnected from the roll operating mechanism by a clutch 106. The direction of movement of the note sheet 101 is reversed by operation of a shift lever 107, which disengages the drive pinion 108 from the gear 109 and simultaneously engages it with the sprocket 110 with the driving shaft. Located in the lower portion of the instrument and adapted to be operated by the pedals 111 is the usual suction bellows or pump 112, by which the motor 105 and the signal actuating devices are operated. The construction thus far described is the ordinary pneumatic player mechanism as commonly used in player pianos.

Associated with each key 113 of the instrument is an air cylinder 114, having therein a reciprocatory piston 115 upon the stem 116 of which there is carried a target or signal head 117. Springs 118 located beneath the pistons 115 in the air cylinders 114 normally tend to elevate the pistons to their uppermost positions.

Leading from the lowermost portion of each air cylinder is an air conduit 119, communicating with a common conduit 120 which leads to the suction bellows or pump 112. The suction pump 112 exhausts the air from the air cylinders 114, drawing the pistons 115 downward therein against the tension of the springs 118.

There is also provided an air cylinder 121, the stem 122 of the piston of which is connected with a bell crank 123, which by its oscillation, serves to connect and disconnect the main drive clutch 106. The piston of the clutch control cylinder 121 is normally pressed upward by a spring 124, which movement serves to disengage clutch 106. The cylinder 121 is connected through a conduit 125 with the suction pump 112, through which the air is exhausted from the cylinder, causing the piston to be drawn downward against the tension of the spring 124 and thereby operatively engaging the clutch 106.

Leading from the tracker bar 4 to each of the signal control cylinders 114, is an air inlet conduit 126. The orifices 127 of the inlet conduits 126, located in the tracker bar 4, are normally closed by the imperforate portions of the note sheet 101. However as each perforation of the note sheet is brought into registry with the corresponding inlet orifice 127 of the tracker bar, air is admitted through the corresponding inlet conduit 126 to the air cylinder 114 associated with the corresponding key or operative element. The admission of air to the air cylinder 114, which previously thereto was in a state of partial vacuum due to the suction of the pump or bellows 112, permits the piston 115 to be elevated therein under the influence of the spring 118. The elevation of the piston 115 projects the target or signal head 117 to a position above a blind or screen 128, behind which the targets are normally concealed.

Referring to Fig. 12, four of the air chambers 114 are shown therein in section, with the operative parts in different relative positions. The sectional cylinder at the extreme left is in its normal position, the piston being held down against the tension of the spring by the exhaustion of the air from the cylinder 114. The two sectional cylinders shown at the right, illustrate the parts in their operated positions, the pistons having been elevated to project the targets 117 above the edge of the blind 128. This has occurred after the admission of air to these cylinders, due to the registry of perforations of the note sheet with corresponding orifices 127 of the tracker bar.

Located in the piston 115 is a by-pass 130, which when the piston is in elevated position is brought into registry upon one side with an air vent 131 open to the atmosphere and upon the other side with the intake orifice of an air conduit 132, communicating with a common conduit 133 leading to the clutch control cylinder 121. When the piston is in its uppermost position, air is admitted through the vent 131, thence through the by-pass 130 and through the conduits 132 and 133 to the cylinder 121, which relieving the vacuum produced therein by the suction pump 112, permits the spring 124 to elevate the piston thereby oscillating the bell crank 123 to disconnect the clutch 106. Thus it is to be seen that each time that the air is admitted through a perforation of the note sheet to operate the signal device, the operation of the signal device will in turn admit air to the clutch control cylinder to disconnect the clutch thereby arresting the movement of the note sheet.

Connected with each key or operative element 113 is a slide valve 134 controlling the air inlet port 131. So long as the key is in its normal position the orifice of the slide valve 134 will register with the vent 131, as shown at the left in Fig. 11. It is to be noted, however, that the vent 131 is closed be the position of the piston 115 so long as the piston remains in its normal or inoperative position.

The depression of one of the signaled keys 113, will move the slide valve 134 downward therewith as shown at the right in Fig. 12, thereby closing the air vent 131, cutting off the admission of air to the clutch control cylinder 121. Since further air can not be admitted to the control cylinder 121, the suction of the pump 112 exhausts the air therefrom, causing the piston to be drawn downward against the tension of its spring 124 to engage the clutch 106, whereby the note sheet will be advanced. The advance of the note sheet moves the perforation thereof out of registry with the corresponding orifice 127, thereby closing the air intake conduit 126 leading to the signal control cylinder 114, whereupon the suction of the pump 112 exhausts the air from said cylinder 114, drawing its piston 115 downward against the tension of the spring 118 and again concealing the target 117 behind the blind or screen 128. The release of the key then elevates the slide valve to its normal position preparatory to the next operation.

It will now be seen that the note sheet is advanced through an intermittent movement, being arrested as each signal is energized until the corresponding key is operated.

Thus as the note sheet is advanced to bring a perforation into registry with an orifice of the tracker bar, air is admitted to the corresponding signal cylinder, permitting the operation of the signal, which in turn admits air to the clutch control cylinder to disengage the clutch, thereby arresting the note sheet. Upon the operation of the key, the air inlet to the clutch control cylinder is closed, whereupon the suction draws the piston down to reëngage the driving clutch, thereby advancing the note sheet to close the orifice 127, whereupon the air being cut off from the signal control cylinder, the suction pump 112 will retract the signal.

If it is desired to operate the note sheet continuously, actuating the signals in predetermined sequence and for proper intervals of time, a shut-off valve 135 is provided in the air conduit 133, leading to the clutch control cylinder 121, which upon being closed, prevents the admission of air to the clutch control cylinder 121, when any one of the signal pistons is elevated. Therefore the suction pump 112 will maintain a constant influence upon the cylinder 121, holding its piston in its lowermost position and the clutch 106 in operative engagement.

If however it is desired to arrest the movement of the note sheet at any time, an air inlet valve 136 is opened thereby admitting air to the clutch control cylinder 121, rendering the suction pump 112 ineffective upon the piston of said cylinder and permitting the spring 124 to elevate the piston to disengage the clutch 106.

In order that the key signal devices may be rendered inoperative for the purpose of testing the student's ability to play the composition from memory, by advancing the note sheet through its step by step movement when the proper keys are manipulated without the aid of the signals, there are provided two stop rods 137 adapted to arrest the movement of the pistons 115 and the targets carried thereby. These stop rods 137 are carried upon swinging arms 138 and are adjusted to and from operative positions by a bell crank 139. When in their adjusted positions the rods 137 are engaged by a shoulder or off set 140 in the piston stems 116, thereby arresting the upward movement of the pistons under the influence of the springs 118, before the targets 117 are visible above the blind 128.

However, the clutch control mechanism is in turn controlled by the movement of the piston 115 and as it is desired that the clutch mechanism shall be operated to intermittently advance the note sheet as the proper keys are manipulated, a limited movement of the pistons 115 is permitted before they are arrested by the stop rod 137. This limited movement of the piston 115 brings a second by pass 141, similar to the by pass 130, into registry with the air vent 131 and the air inlet conduit 132 leading to the clutch control cylinder 121. Thus as each perforation passes over the tracker bar, the piston 115 of the corresponding air cylinder 114 will be released for a limited movement upward, until arrested by the stop rod 137. This upward movement, while insufficient to disclose the target 117 will open the vent 131 and the inlet conduit 132 to admit air to the clutch control cylinder, thereby effecting the release of the clutch 106, until the proper key is manipulated.

Upon the depression of the key, the slide valve connected therewith closes the air vent 131, whereupon the suction pump 112, by exhausting the air from the control cylinder 121, will cause the reëngagement of the clutch 106. The reëngagement of the clutch will cause the advance of the note sheet 101 and when an imperforate portion thereof closes the air inlet conduit 126, the suction pump 112 will effect the return of the piston 115 to its normal position.

In Fig. 12 of the drawing, the piston 115 of the second sectional cylinder from the left, is illustrated in its operated position, wherein its movement has been arrested by the stop rod 137 and the air inlet passage opened to the clutch control cylinder 121 to effect the release of the clutch 106. The relation of the stop rod 137 with the piston rod 116 is best shown in Fig. 11.

In Fig. 13 there is shown a modification of the air cylinders disclosed in Figs. 11 and 12. In this construction the several conduits 119, 126 and 132 lead from the cylinder to the suction pump 112, the tracker bar 104 and the clutch control cylinder 121 respectively, exactly as before mentioned. However in lieu of the piston 115 there is supplied a diaphragm 142. The stem 143 connected at one end to the diaphragm 142 projects through an opening 144 in the key 113 and carries at its upper end a target 145. This target may be exposed through suitable view-openings 146 in a blind or screen or may be exposed over the upper edge of such blind. The stem 143 carries two valve heads 147 and 148 adapted upon the reciprocatory movement of the stem to alternately close corresponding openings through which the inlet conduit 132 leading to the clutch control cylinder 121, may communicate with the atmosphere or the interior of the cylinder respectively.

This stem also carries a shoulder or pin 149 adapted to be engaged by the key 113, whereby the stem 143 will be depressed in unison with the key. In its normal position as shown at the right of Fig. 13 the valve head 147 closes the opening through which the conduit 132 communicates to the atmosphere and the head 148 opens the orifice through which said conduit 132 communicates with the interior of the cylinder, thereby placing the suction pump 112 in direct communication through the conduit 119, the cylinder and the air conduit 132 with the clutch control cylinder 121. The suction pump thereby exhausts the air from the cylinder 121, drawing its piston down to engage the clutch 106.

There is provided a small vent 150 in the diaphragm 142, through which the suction pump 112 exhausts the air from that portion of the cylinder beneath the diaphragm and from the conduit 126, the opposite end of which, it is to be understood, is closed by an imperforate portion of the note sheet then passing over the orifices 127 of the tracker bar.

However when a perforation of the note sheet registers with the orifice 127 of the conduit 126, a current of air rushes through the conduit 126 and forces the diaphragm 142 upward, as shown to the left in Fig. 13, carrying with it the stem 143. The upward movement of the stem 143 projects the target 145 into position to be seen through the orifice 146 in the screen or blind. At the same time the movement of the stem 143 shifts the valve head 148 to close the orifice from the conduit 132 to the interior of the cylinder and at the same time the head 147 is shifted to open the conduit to the atmosphere. The air will thereby be admitted through the conduit 132 to the cylinder 121, permitting its piston, under the influence of its spring to disconnect the clutch 106.

When the signaled key is depressed it engages the shoulder or pin 149 and presses the stem 143 downward in unison with the movement of the key to reverse the valves 147 and 148 to reëstablish the connection between the exhaust conduit 119 and the conduit 132, whereby the air will be exhausted from the control cylinder 121 to reëngage the clutch 106.

This form of air cylinder or control valve may be readily substituted for the construction disclosed in Figs. 11 and 12. By the use of this form of device, the exhaust conduit 125, leading from the clutch control cylinder 121 to the suction pump 112 is eliminated.

While there has been hereinbefore described different forms of apparatus for operating visual signals to indicate the proper sequence and time intervals in which the keys are to be manipulated, it is possible by a very simple attachment to employ the means and mechanism usually found in mechanically operated pianos, for accomplishing the same result. Such construction is shown in Fig. 14.

In this construction the instrument key 113 is shown operatively connected with an operating bellows 151 by means of a link 152, whereby as the bellows 151 is expanded the key is operated. An air conduit 153 leads from a corresponding orifice in the tracker bar 104 to the bellows member 151 and an exhaust conduit 154 leads from said bellows member 151 to the suction pump 112. Air is admitted through the conduit 153 to the bellows member 151, permitting said bellows member to expand under the influence of its spring and operating the key 113 to produce a blow of the hammer upon the strings. As the orifice of the conduit 153 is closed by an imperforate portion of the note sheet, the suction pump 112 exhausts the air from the bellows member 151, returning the operated parts to normal position. This is a common form of apparatus and the usual operation now employed for audibly operating a piano. Any other form of pneumatic key operating mechanism may be utilized in lieu of that shown in Fig. 14.

To employ this ordinary and commonly used construction to produce an indicative movement of the key itself which will serve as a visual signal without operating said key sufficiently to produce a sound, there are pivoted upon a transverse shaft 155 two swinging frames, one for the treble and one for the bass. These frames comprise swinging arms 156 connected at their free ends by a strip of cloth or other semi porous material adapted to register with the orifices 127 of the tracker bar. These porous strips 157 bear upon the outer surface of the note sheet immediately over such orifices 127. The air admitted through said orifices to the key operating mechanism must pass through said strips 157. These strips will so reduce the quantity of air admitted, that the operation of the playing mechanism will be retarded, causing only a limited movement of the key 113, sufficient to distinguish it from the adjacent keys, but not sufficient to produce a sound. The porous strips 157 are pressed into engagement with the note sheet by springs 158.

In lieu of the porous strips 157 for regulating the admission of air to the key-operating mechanism, there may be provided in the exhaust conduit 154 a valved orifice 159, through which a limited amount of air may be admitted to the suction pump 112, whereby the influence of the suction pump will be reduced and the action of the key operating mechanism will not be sufficient to operate such key, but will only be sufficient to produce a limited movement thereof, sufficient to distinguish the key from the adjacent keys. Likewise a single swinging frame common to both treble and bass may be used.

In Fig. 15 there is shown a modification of this construction, in which the porous strips 157 are replaced by imperforate or metallic strips 160 adjusted in the arms 156 so that they will only partially cover the orifices 127 in the tracker bar 104. By this construction, only a limited amount of air may be admitted to the orifice 127, thereby retarding the operation of the key operating mechanism to produce only a limited movement of the key in the manner before mentioned.

In Fig. 16 there is shown a modification embodying mechanically operated means for controlling the visual signals in accordance with the composition to be played. In this construction the visual signal 161 is carried upon the extremity of a spring arm 162 and is normally concealed behind a blind or screen 163. This signal is located immediately above the key 113, which carries a hook or eye 164 adapted to engage with the arm 162, when said arm is in its elevated position as shown by dotted lines, and to depress said arm in unison with the depression of the key 113. The note sheet is mounted to travel immediately above the series of spring arms 162, each of which is provided with a finger 165 bearing upon the imperforate portion of the note sheet to maintain the spring arm 162 in its depressed or flexed position.

The perforations 166 of the note sheet are so located therein as to register with the finger 165, whereby as the note sheet advances, the fingers 165 will be projected through the perforations by the resiliency of the spring arm 162, thereby arresting the movement of the note sheet by the engagement of said finger 165 and the perforation 166 and permitting the arm 162 to elevate the target 161 above the edge of the blind 163. This position of the arm and target is shown by dotted lines in Fig. 16. Upon the depression of the key 113, the hook 164 engages the resilient arm 162 drawing said arm downward in unison with the depression of the key, thereby placing the arm under stress and withdrawing the finger 165 from the perforation 166 to allow the note sheet to move forward, whereupon the flexible arm 162 is held down by the engagement of the finger 165 with an imperforate portion of the note sheet.

It is obvious that in lieu of the perforated note sheet as herein shown and described, a note sheet having local modifications in relief or having depressions therein, might be employed when operating the several devices or a sheet having metallic contacts thereon might be employed in the electrical apparatus, therefore applicant does not limit himself to the particular note sheet provided with a series of perforations corresponding to the different notes, nor does he limit himself to the particular electrical circuits as disclosed in Fig. 7 of the drawings, as the said circuits may be differently connected to accomplish the same result.

In Fig. 17 the signal means hereinbefore described is shown as applied to a guitar. In this construction the note sheet 22 is unwound from the roll 21 and rewound upon the roll 23 by means of the drive motor 32 and the intermediate driving connections as before described. The note sheet 22 is provided with perforations through which the spring fingers 52 make contact with the common terminal bar 45 to close the several signal circuits from the battery 62 in the manner before mentioned. The neck of the guitar is provided with a plurality of electrical signal lamps or other signal devices one for each of the strings $167^x$ which in this instance are the playing elements. The signal devices are arranged in several series, one series $167^x$ being located adjacent to the nut to indicate the open strings to be played, while other series of signals $167^y$ are located adjacent to the several frets to indicate the finger positions at which the several strings are to be held and a third series of signals $167^z$, one signal for each string to indicate the particular string to be played. Each of the signal lamps or other similar signal devices are connected upon one side with the corresponding spring-finger 52, which is adapted to make contact with the common terminal bar 45 through the perforations of the note sheet, the said terminal bar being connected with one side of the battery 62. The plurality of lamps or signal devices are connected by a common conductor 168 with the opposite side of the battery.

In Fig. 18 there is shown the neck of a violin to which the signal devices similar to those of Fig. 17 have been applied. Signal lamps $167^x$ are located in the neck of the violin adjacent to the nut to indicate open strings to be played, while other signal lamps or devices $167^y$ are located throughout the finger board to indicate the various finger positions at which the various strings are to be held to produce other notes and signals $167^z$, one for each string, to indicate the particular string to be played. In addition to the signal devices or lamps upon the finger board of the violin two additional lamps 169 are provided upon each side of the body of the instrument to indicate the direction in which the bow should be moved. The signal lamps of the finger board and those indicating the bowing movements are controlled in predetermined sequence by means of the note sheet as before described.

In this figure and the succeeding figure Fig. 19, the note sheet with its controlling mechanism and the battery have been omitted. It is to be understood however, that such mechanism is employed in the same relation as is shown in Fig. 16.

Fig. 19 illustrates the application of the method to a flute in which each finger hole and key is provided with a lamp or other signal device to be operated in predetermined sequence according to the composition to be played. These signal lamps are connected upon one side with a common conductor leading to the battery and upon the other side are connected through individual conductors with the corresponding spring fingers 52. It is obvious that instead of applying the signals directly to the instrument, there may be employed a chart upon which appears an outline of the instrument, somewhat as is shown in Figs. 16, 17 and 18 to which the signal lamps or other devices are applied in proper position and energized in predetermined sequence by means of the note sheet. The pupil by observing the sequence of the operation of the signals upon the chart is enabled to operate the strings, keys or other operative elements of the instrument in corresponding sequence. If found necessary, the finger positions may be indicated upon the violin neck or by means of a paper chart secured thereto or by otherwise marking them upon the finger board.

In the claims of this application and my copending applications, I have referred to the signals as being in register with the elements of the instrument to be manipulated, such as the keys, thereby indicating that a definite relation or association exists between each signal and a corresponding key, which will be apparent to the pupil when the signals are in operation. This relation may be established either by locating the signals on or adjacent to the keys or by using a chart, as herein described, or in any desired manner.

From the above description it will be apparent that there is thus provided a device of the character described, possessing the particular features of advantage before enumerated as desirable, but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. A musical instrument comprising a plurality of elements to be manually manipulated by the fingers of the player, in combination with a series of independent signals each located in register with one of said elements, means controlled by the manipulation of said elements for actuating said signals in predetermined sequence in accordance with a particular musical composition, said means comprising parts for causing the manipulation of an element to actuate the signal for the next element to be manipulated, and means to render the signals inoperative while permitting a continued operation of said first-named means.

2. The combination with a musical instrument comprising a plurality of elements to be manually manipulated by the player in playing the same, of a plurality of signals each located in register with one of said elements, operating connections extending to each of said signals, actuating mechanism comprising a plurality of parts each adapted to operate one of said operating connections and thereby actuate said signals to indicate the order in which said elements should be manipulated in playing a musical composition, means for marking the time in which said elements should be manipulated in playing the composition, an operating connection extending to said time marking means, and means operated by said actuating mechanism for operating said last named connection.

3. The combination with a musical instrument comprising a plurality of elements to be manipulated by the player in playing the same, of a plurality of signals each located in register with one of said elements, means for actuating said signals in predetermined sequence to indicate the order in which said elements should be manipulated, said means being controlled by the manipulation of said elements in response to said signals, and means connected to said first-named means for rendering said first-named means operable independently of the manipulations of said elements.

4. The combination with a musical instrument comprising a plurality of elements to be manipulated by the player in playing the same, of a plurality of signals each located in register with one of said elements, mechanically actuated means for operating said signals in predetermined sequence to indicate the order in which said elements are to be manipulated in playing a musical composition, and manually controlled means for arresting the operation of said first-named means at will.

5. In combination, a series of elements to be manipulated by the player, a traveling selector bearing a series of local modifications representing successive notes of a musical composition, means to actuate the selector through an intermittent movement comprising a motor, a driving connection for the motor disengaged at each advance movement of the selector, means to reëstablish the driving connection by the manipulation of the element of a musical instrument corresponding to the local modification of the selector positioned by the advance movement thereof.

6. The combination with a musical instrument having a plurality of keys, of a traveling control element bearing a series of local modifications representing successive characters of a musical composition, a drive shaft controlling the movement of the control element, a motor, means for intermittently connecting the motor with the drive shaft, means for disconnecting the motor and drive shaft at each advance movement of the control element, and means to restore the driving connection by the manipulation of the keys of said musical instrument corresponding to the local modification of the control element positioned by said advance movement.

7. In combination, a series of elements of a musical instrument to be manually operated by the player, a selector bearing a series of local modifications representing successive characters of a musical composition, a motor arranged to bring successive local modifications of the selector to operative positions, a driving connection between said motor and selector, an electro-magnet controlling the engagement and disengagement of the driving connection, and an electric circuit in which the electro-magnet is included, said circuit comprising branches which are alternately opened and closed by the manual operation of said elements to intermittently advance the selector.

8. A music instructing device comprising a selector bearing a series of local modifications representing successive characters of a musical composition, a motor actuating the selector to present successive local modifications thereof in operative position, a driving connection from the motor including a flexible shaft, a swinging frame, a driving member carried by the swinging frame and actuated by the flexible shaft, said driving member being moved to and from operative engagement by the oscillation of the frame, an electro-magnet, an armature therefor connected with the swinging frame, an electric circuit controlling the magnet, said circuit being successively opened and closed by the positioning of successive local modifications of the selector, thereby energizing the electro-magnet to vary the operative engagement of the driving member.

9. In combination, a series of signals one for each element of a musical instrument to be played, a traveling control element having local modifications controlling said signals, driving mechanism for the control element capable of alternately driving the control element in reverse directions, a plurality of electrical contacts one for each of the signals, a contact bar common to a plurality of said contacts with which the contacts engage in predetermined sequence determined by the local modifications of the control element, a movable frame in which said common contact bar is carried, and reversing means for the driving mechanism adapted to shift the common contact bar into and out of position to be engaged by the contacts.

10. A music instructing device comprising a traveling control element determining the sequence of operation of the playing elements of a musical instrument to produce a musical composition, a series of signals one for each playing element to be operated, a series of local modifications in said control element governing said signals, means whereby the control element is caused to stop simultaneously with the operation of a signal of said series, and a local modification of said control element having connections to cause the control element to stop independent of the operation of a signal of said series when the end of the composition has been reached.

11. In combination, a plurality of elements of a musical instrument to be manipulated, a traveling selector determining the sequence of operation of said elements to reproduce a musical composition, an electric motor actuating the selector, an electric circuit controlling the motor, and a switch in said circuit controlled by the selector to intermittently render the motor ineffective for actuating the selector, said motor being restored to effective operation by the operation of an element, said selector having a local modification adapted to operate the switch to render the motor ineffective for actuating the selector when the end of the composition has been reached independent of the elements.

12. A music instructing device comprising a series of signals, an electric circuit having a plurality of branches one for each signal, a make-and-break contact in each branch, and a control element controlling the operation of said make-and-break contacts, means comprising an electro-magnet in said circuit arranged to cause the operation of the control element to cease, said electro-magnet having a low resistance and a high resistance winding, means to shunt the current through either the high or low resistance windings, and connections whereby when the current is passed through the high resistance winding the signals will be inoperative.

13. The combination with a musical instrument comprising a plurality of elements to be manipulated by the player, of a series of signals each located in register with one of said elements, a control element for controlling the operation of said signals to indicate the order in which said elements should be manipulated in playing a musical composition, means for actuating said control element, and means in combination with said last-named means for rendering said signals inoperative while allowing the continued operation of said control element.

14. The combination with a musical instrument comprising a plurality of elements to be manipulated manually by the player, of a series of signals arranged in register with said elements, means comprising a control element for actuating said signals, means for operating said control element intermittently in unison with the manipulation of said elements, means for rendering said signals inoperative, and means for temporarily reëstablishing the operation of said signals.

15. The combination with a musical instrument comprising a plurality of elements to be manually manipulated by the player, of a series of signals arranged in register with said elements, electric circuits comprising separate branches for energizing said signals independently of each other, a control element controlling the electric circuits to energize the signals in predetermined sequence in accordance with the notes of a musical composition, and means for inserting resistance into said circuits to temporarily render the signals inoperative.

16. The combination with a musical instrument comprising a plurality of elements to be manually manipulated by the player, of a series of signals arranged in register with said elements, an electric circuit comprising separate branches for energizing said signals, a control element controlling said branch circuits to energize the signals in predetermined sequence corresponding to a musical composition, resistance connected in said circuit for rendering the signals inoperative, and a switch for short-circuiting said resistance whereby said signals may be temporarily energized by the operation of the control element.

17. In combination, a plurality of elements of a musical instrument to be manipulated by the player, a series of signals arranged in register with said elements, means comprising a control element for controlling the operation of said signals and normally controlled by the operation of said elements, and means to cause said control element to operate said signals in predetermined sequence independent of the manipulation of said elements.

18. The combination with a musical instrument comprising a plurality of elements to be manipulated by the player, of a plurality of signals in register with said elements, a control element, actuating means for normally operating said control element intermittently, means controlled by said control element to operate said signals in predetermined sequence, means for releasing the control element from its intermittent operation, and means for causing it to operate said signals continuously.

19. The combination with a musical instrument comprising a plurality of elements to be manually manipulated by the player, of a series of signals, one for each of said elements, a control element normally controlled by the manipulation of said elements of the musical instrument, means controlled thereby to operate the signals in predetermined sequence, means for releasing the control element from the control of the elements of the instrument, and means for causing said control element to operate the signals independent of the elements of the instrument.

20. The combination with a musical instrument comprising a plurality of elements to be manually manipulated by the player, of a series of signals, one for each of said elements, an electric circuit comprising separate branches controlling said signals, means comprising a control element for controlling said branches, an electrically operated element in said circuit and arranged to cause said control element to stop at each operation of a signal, and means for rendering said electrically operated element inoperative.

21. The combination with a musical instrument comprising a plurality of elements to be manually manipulated by the player, of a series of stationary signals, each fixed in register with one of said elements, means comprising a control element for actuating said signals in definite order corresponding to the notes of a musical composition to indicate the order in which said elements should be manipulated, and means for automatically arresting the operation of said control element when the musical composition has been played.

22. The combination with a musical instrument comprising a plurality of elements to be manually manipulated by the player, of a series of signals, one for each of said elements, means for actuating said signals, a movable control element for controlling the actuation of said signals in predetermined sequence in accordance with a musical composition, means tending normally to arrest the movement of said control element, means for normally neutralizing the influence of said last-named means, means for temporarily interrupting the influence of said neutralizing means simultaneously with the operation of a signal, and means to restore the influence of said neutralizing element by the manipulation of one of said elements of the instrument.

23. In combination, a musical instrument having a series of elements to be manually manipulated by the player, means to pre-indicate each one of said elements in the order in which said elements shall be manipulated in playing a musical composition, and means to pre-indicate the digit of the player which shall be used in manipulating each of said elements in response to the operation of said first-named means.

24. In combination, a musical instrument having a series of elements to be manually manipulated in playing said instrument, signaling means for indicating the elements to be manipulated, a series of indicators arranged in the order of the digits to be employed in manipulating said elements, and means in combination with said signaling means for actuating said indicators to indicate the digit to be employed in manipulating each of said elements in response to said signaling means.

25. In combination, a musical instrument having a series of elements to be manually manipulated in playing a musical composition, a series of signals arranged in the order of said elements, a second series of signals arranged in the order of the digits of the player, means to actuate said first-named signals in predetermined order to indicate the order in which said elements shall be manipulated, and means in combination with said first-named means and said second-named signals for actuating the latter in such wise as to indicate the digit to be employed by the player in manipulating each of said elements.

26. The combination with a musical instrument having a plurality of elements to be manually manipulated by the player, of a plurality of signals each fixed in register with one of said elements, means to actuate said signals in sequence to indicate the order in which said elements should be manipulated to play a musical composition, and an additional signal also actuated by said last-named means for indicating rhythm and the like.

In testimony whereof I have hereunto set my hand this 25th day of April, 1913.

EDWIN M. SCHANTZ.

Witnesses:
ALFRED McCRAY,
BESS CROASMUN.